(12) United States Patent
Weelink

(10) Patent No.: US 9,648,848 B2
(45) Date of Patent: May 16, 2017

(54) MIXING AND DOSING DEVICE FOR CATTLE FEED

(75) Inventor: Johannes Martinus Willibrordus Weelink, Glimmen (NL)

(73) Assignee: WEELINK PARTICIPATIES B.V., Glimmen (NL)

(*) Notice: Subject to any disclaimer, the term of this patent is extended or adjusted under 35 U.S.C. 154(b) by 825 days.

(21) Appl. No.: 13/996,770

(22) PCT Filed: Dec. 20, 2011

(86) PCT No.: PCT/NL2011/050867
§ 371 (c)(1),
(2), (4) Date: Jun. 21, 2013

(87) PCT Pub. No.: WO2012/087123
PCT Pub. Date: Jun. 28, 2012

(65) Prior Publication Data
US 2013/0298837 A1   Nov. 14, 2013

(30) Foreign Application Priority Data

Dec. 21, 2010   (NL) .................................... 2005889

(51) Int. Cl.
*A01K 5/02*     (2006.01)
*A01K 5/00*     (2006.01)
(Continued)

(52) U.S. Cl.
CPC ............... *A01K 5/02* (2013.01); *A01K 5/001* (2013.01); *A01K 5/0225* (2013.01);
(Continued)

(58) Field of Classification Search
CPC ...... A01K 5/02; A01K 5/0275; A01K 11/006; A01K 29/005; A01K 11/008;
(Continued)

(56) References Cited

U.S. PATENT DOCUMENTS 5,109,799 A * 5/1992 Lader .................. A01K 5/0291
                                                            119/51.13
5,653,192 A * 8/1997 Sheen ...................... A01K 1/12
                                                            119/51.02
(Continued)

FOREIGN PATENT DOCUMENTS

DE      19756367 A1    7/1999
EP       0677245 A1   10/1995
(Continued)

OTHER PUBLICATIONS

Search Report and written opinion from NL Application #NL2005889; mailed Jul. 14, 2011.

*Primary Examiner* — Daniel J Troy
*Assistant Examiner* — Hiwot Tefera
(74) *Attorney, Agent, or Firm* — Oppedahl Patent Law Firm LLC

(57) ABSTRACT

The invention relates to a mixing and dosing device for cattle feed, comprising a plurality of feed hoppers for different types of feed, wherein each hopper has an infeed end and an outfeed end disposed thereunder, wherein a dosing device is disposed in each hopper at its outfeed end, further comprising a control device adapted to control each of the dosing devices in order to dose feed from the associated hopper, a pivotable distributing hopper disposed under the plurality of outfeed ends, outfeed ports placed under the distributing hopper for connection to fodder conduits debouching in different feed troughs, further comprising one or more actuators for pivoting the distributing hopper, wherein the control device is further adapted to control the actuators so as to position the distributing hopper with its downstream end substantially above a selected one of the outfeed ports. The invention also relates to a feeding (Continued)

stall for feeding animals and a system and method for tracking positions of animals.

15 Claims, 10 Drawing Sheets

(51) Int. Cl.
  *A01K 11/00* (2006.01)
  *A01K 29/00* (2006.01)
  *G01S 5/02* (2010.01)

(52) U.S. Cl.
  CPC .......... *A01K 5/0275* (2013.01); *A01K 11/006* (2013.01); *A01K 11/008* (2013.01); *A01K 29/005* (2013.01); *G01S 5/02* (2013.01); *G01S 5/0252* (2013.01)

(58) Field of Classification Search
  CPC .... A01K 5/0225; A01K 5/001; A01K 5/0291; G01S 5/0252; G01S 5/02
  USPC ...................... 119/51.02, 51.13, 53
  See application file for complete search history.

(56) References Cited

U.S. PATENT DOCUMENTS

| | | | | |
|---|---|---|---|---|
| 6,516,270 | B2* | 2/2003 | Pavlak | A01K 5/02 342/357.48 |
| 6,651,585 | B2* | 11/2003 | van den Berg | A01K 1/12 119/51.02 |
| 7,972,055 | B2* | 7/2011 | Adent | A01K 5/02 366/142 |
| 9,161,518 | B2* | 10/2015 | Al-Omani | A01K 39/012 |
| 2003/0062003 | A1* | 4/2003 | Voogd | A01K 1/12 119/521 |
| 2005/0120965 | A1* | 6/2005 | Van Den Berg | A01J 5/017 119/14.02 |
| 2005/0211187 | A1* | 9/2005 | Harman | A01K 27/009 119/721 |
| 2005/0241588 | A1* | 11/2005 | Foster | A01K 5/0225 119/57.91 |
| 2005/0257748 | A1* | 11/2005 | Kriesel | A01K 11/008 119/51.02 |
| 2009/0066568 | A1 | 3/2009 | Britz et al. | |
| 2009/0133634 | A1* | 5/2009 | Axelsson | A01J 5/003 119/14.08 |
| 2010/0017024 | A1* | 1/2010 | Adent | A01K 5/02 700/236 |
| 2010/0107983 | A1* | 5/2010 | Gates | A01K 5/0225 119/53 |
| 2010/0321182 | A1* | 12/2010 | Wangrud | A01K 11/008 340/539.13 |
| 2013/0199450 | A1* | 8/2013 | Harty, Sr. | A01K 5/0225 119/51.02 |

FOREIGN PATENT DOCUMENTS

| | | |
|---|---|---|
| EP | 1787510 | 5/2007 |
| EP | 2169501 B1 | 3/2010 |
| WO | 2006022548 A1 | 3/2006 |
| WO | 2007040388 A1 | 4/2007 |
| WO | 2008113556 A1 | 9/2008 |
| WO | 2010066429 A1 | 6/2010 |

* cited by examiner

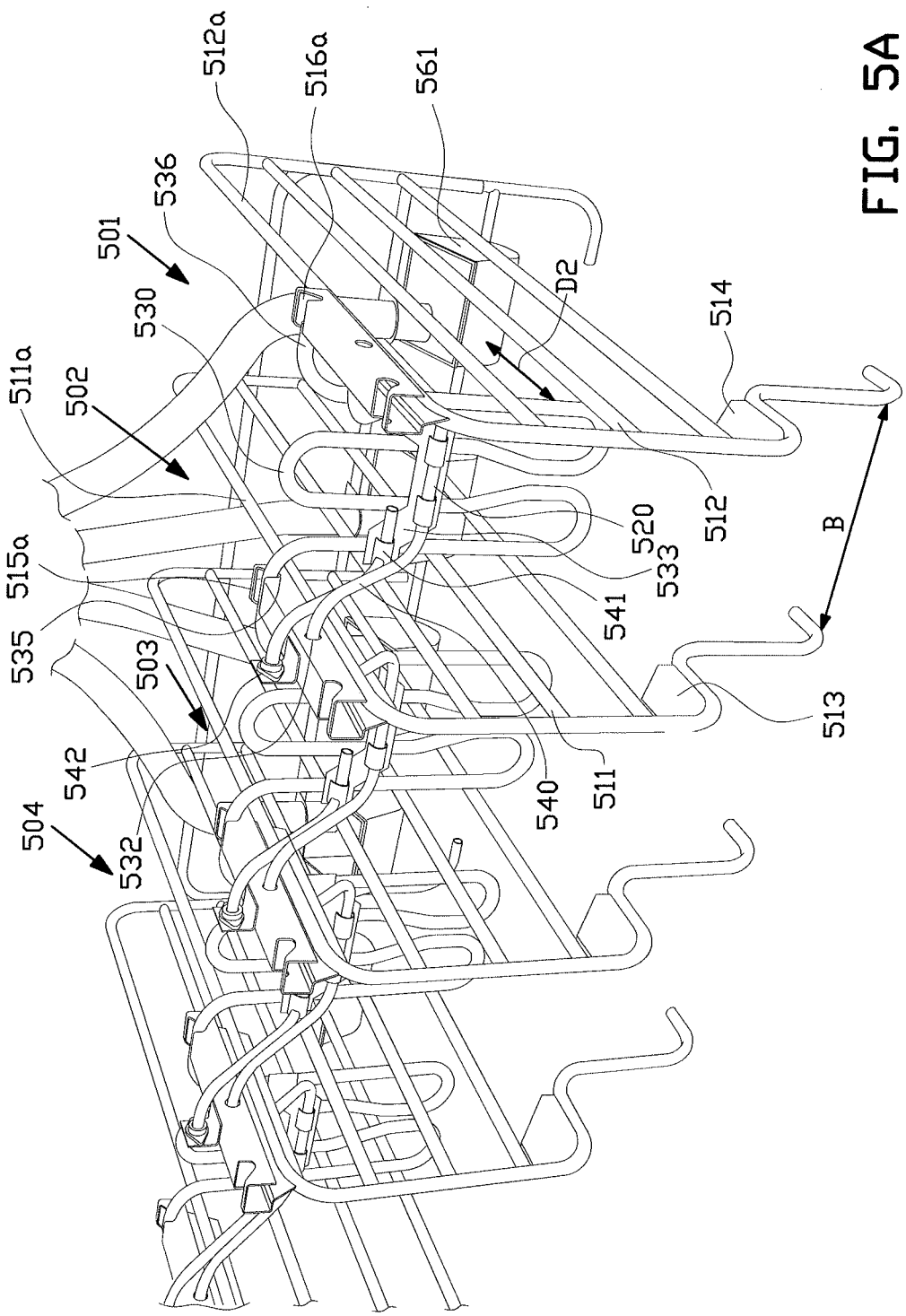

MIXING AND DOSING DEVICE FOR CATTLE FEED

BACKGROUND OF THE INVENTION

The invention relates to a mixing and dosing device for cattle feed, with which different types of fodder can be provided to different feed troughs in desired mixing ratios. Such a mixing and dosing device is known from Australian Application No. AU 20100009, in which a mechanical transport device is described which can move forward and backward at variable speed in order to transport a fodder mixture to animals. A drawback of this known mixing and dosing device is that moving the transport device forward or backward affects the supply of feed to all animals being supplied with feed at that moment, and animals cannot therefore be served separately of each other.

Known mixing and dosing devices are usually adapted to supply feed to a feed trough present in a feeding stall. A drawback thereof is that animals standing in the feeding stall are often bothered by animals also wishing to get to the feed trough.

It is an object of the invention to at least partially obviate these drawbacks.

SUMMARY OF THE INVENTION

According to a first aspect, the invention provides for this purpose a mixing and dosing device for cattle feed, comprising a plurality of feed hoppers for different types of fodder, wherein each of the plurality of hoppers has an infeed end and an outfeed end disposed thereunder, wherein a dosing device is disposed in each hopper at its outfeed end, further comprising a control device adapted to control each of the dosing devices in order to dose feed from the associated hopper, a pivotable distributing hopper disposed under the plurality of outfeed ends, outfeed ports placed under the distributing hopper for connection to fodder conduits debouching in different feed troughs, further comprising one or more actuators for pivoting the distributing hopper, wherein the control device is further adapted to control the actuators so as to position the distributing hopper with its downstream end substantially above a selected one of the outfeed ports. By positioning the distributing hopper above different outfeed ports it is thus possible to suffice with a single and stationary mixing and dosing device to provide a plurality of animals or groups of animals with individually adapted feed mixtures.

In an advantageous embodiment of the mixing and dosing device according to the invention the outfeed ports and the distributing hopper are positioned such that the fodders come together in a free fall at one point, i.e. the downstream end of the distributing hopper. The mixing of the different fodders is hereby effected in advantageous manner. A mixing device, wherein the different fodders are first mixed in a mixing device before the different fodders are carried into the distributing hopper, can hereby be omitted.

The fodder ratios and dosages can be set per moment in time and/or per outfeed port, after which the fodder is guided directly to the animals. Because the mixing takes place immediately before the mixture reaches the animals, the mixture remains fresh. The different types of fodder, for instance dry and wet fodder, remain separated from each other until immediately before the animals are supplied with the fodder, which increases the storage life. It is also possible with this device to set determined feeding times per outfeed port.

In an embodiment the dosing devices comprise transport devices. In an alternative embodiment the dosing devices comprise valves which can be set in an open position, in which they close an outfeed end, and in a closed position in which they close an outfeed end of a hopper.

In an embodiment the control device is adapted to individually control the transport speed of each of the transport devices in order to obtain a desired mixing ratio of feed from the plurality of hoppers.

In an embodiment the control device is adapted to individually activate and deactivate the transport devices for determined periods of time per transport device in order to obtain a desired mixing ratio of feed from the plurality of hoppers. In this embodiment simple transport devices with a constant transport speed can be used.

In an embodiment the control device is adapted to control the transport devices in order to transport a predetermined quantity of feed out of the feed hoppers. The dosage can thus also be set as well as the mixing ratios.

In an embodiment the mixing and dosing device is further provided with a mixing mill placed downstream of the outfeed ends and upstream of the outfeed ports. The mixing mill is adapted to mix the different feed flows to one feed flow before this feed flow leaves the outfeed ports. This results particularly in outfeed of more homogeneous mixtures when the different types of feed which are mixed differ greatly in structure.

In an embodiment the mixing and dosing device further comprises a plurality of feed troughs, wherein each of the feed troughs is connected to an outfeed port, wherein the control device is adapted to determine ratios in which the different types of feed are dosed from the different hoppers on the basis of the animal or animal group associated with the feed trough. It is thus possible to set a tailored diet for animals or animal groups, for instance animals in different age groups, stages of growth and/or stages of production.

In an embodiment the mixing and dosing device is further provided with animal identification means for identifying animals or animal groups at the feed trough, wherein the control device is adapted to determine ratios in which the different types of feed are dosed from the different hoppers on the basis of the animal or animal group recognized at the feed trough. The animal identification means are preferably placed on or at the feed trough. The animal identification means for instance comprise receivers adapted to receive signals from transmitters attached to the animal, such as RFID transmitters, or cameras with which an animal can be recognized on the basis of the image of the animal. In a preferred embodiment, access to a feed trough is granted or refused on the basis of the identified animal.

In an embodiment the mixing and dosing device is further provided with an additive dosing device with an outlet positioned above the distributing hopper, wherein the control means are further adapted to control the additive dosing device so as to add additive to feed in the distributing hopper, preferably on the basis of the identified animal or the identified animal group. The additives, for instance vitamins, minerals and/or medicines, can thus be added to the feed being supplied to an animal or group of animals.

In an embodiment one or more of the feed troughs are connected via a slide or drop channel to their corresponding outfeed ports. Each feed trough is connected to one outfeed port. The fodder mixture coming from the mixing and dosing device is thus transported to the feed troughs substantially using gravitational force.

In a preferred embodiment, the mixing and dosing device is adapted for placing preferably well above the feed troughs, in particular well above the height of the animals making use of the feed troughs. The feed can thus fall or slide into a feed trough at a distance from the mixing and dosing device, while the mixing and dosing device leaves the floor surface substantially clear.

In an embodiment one or more of the feed troughs are connected via an auger conduit to the outfeed ports. Such auger conduits are known in the art and preferably comprise electrically driven spiral augers. With such auger conduits the fodder mixture can also be transported in substantially horizontally arranged conduits. An additional advantage is that the position of a portion of mixed fodder in the auger conduit can be determined on the basis of the number of rotations the auger has made from the moment the portion of mixed fodder entered the auger conduit.

In an embodiment the transport devices comprise augers.

In an embodiment at least one auger conduit is provided at different defined locations with outfeed holes for allowing feed out of the auger conduit, and the auger conduit comprises at each outfeed hole an associated valve which is controllable by the control device and can be controlled between a closed position, in which it substantially closes the associated outfeed hole, and an opened position in which it substantially does not close the associated outfeed hole. The control device is preferably adapted to determine the positions of portions of mixed fodder in the auger conduit on the basis of the number of rotations of the auger after the portion of mixed fodder entered the auger conduit, and further adapted to control the valves to the closed or opened position on the basis of the determined positions of the portions of mixed fodder. Portions of mixed fodder can thus be supplied in targeted manner to different locations along the auger conduit, for instance to feed troughs.

In an embodiment the infeed ends of the hoppers are connected to different silos containing different types of feed. Feed is preferably carried automatically from a silo to an associated hopper when less than a predetermined part of the hopper is filled.

Placed upstream of the infeed end of a hopper in an embodiment is a cutting device which is adapted to cut fodder before it enters the hopper. Relatively large and/or hard types of fodder, such as tubers, can thus be added freshly cut to the mixture.

According to a second aspect, the invention provides a method for selectively mixing feed on the basis of a recognized animal, comprising of: recognizing an animal at a feed trough, retrieving from a database mixing ratios of feed associated with the animal, controlling a mixing and dosing device to mix a quantity of feed for the animal in accordance with the retrieved mixing ratios. Use is preferably made of a mixing and dosing device as described above. Owing to the method a portion of feed with desired mixing ratios can be delivered per animal or animal group. In an embodiment additives such as vitamins, minerals, flavourings and/or medicines are added to the mixture on the basis of the recognized animal.

In an embodiment the method further comprises a step of retrieving a dosage of feed associated with the animal and controlling the mixing and dosing device to mix the quantity of feed for the animal in accordance with the retrieved dosage, so that the dosage can also be set per animal or animal group.

In an embodiment the method comprises a step of mixing and/or dosing the feed on the basis of previous eating behaviour of the recognized animal.

In an embodiment the animals are cows and the feed is mixed and/or dosed on the basis of the previous point in time at which the animal was milked.

In an embodiment the mixing and dosing device is provided with a plurality of outfeed ports leading to different feed troughs, and the method comprises the step of adjusting the outfeed port to which the fodder mixture is delivered on the basis of the feed trough where the animal is recognized. Using one mixing and dosing device animals can thus have an individually adapted fodder mixture delivered at different feed troughs.

According to a third aspect, the invention provides a feeding stall for feeding cattle, comprising a first separating fence and a second separating fence which are disposed parallel to each other, wherein the two separating fences define a passage for an animal to reach a feed trough, further comprising a closure which is movable to an opened position, in which it leaves the passage for an animal clear, wherein the closure is further movable to a first closed position in which it closes the passage to an animal at a first distance from the feed trough, wherein the first distance is greater than the length of an animal.

When the closure is in the opened position, the access to the passage between the separating fences to the feeding trough is free to an animal, and an animal can walk in and out of the feeding stall.

When the closure is then moved from the opened to the first closed position, the animal is present in the feeding stall, and the closure closes the feeding stall on a rear side of the animal. The animal being fed is thus protected from other animals and is not disturbed while consuming feed.

In an embodiment the closure is movable further to a second closed position, in which it closes the passage to an animal at a second distance from the feed trough, wherein the second distance is smaller than the first distance. The second distance is preferably small, for instance less than 20 centimeters.

When the closure is in second closed position an animal can walk at least partially into the feeding stall but the animal does not have access to the feed. When the closure is moved to the first closed position the animal gains access to the feed and the animal is enclosed in the feeding stall. When the closure is in the first closed position the passage preferably provides space for substantially one animal. The width of the passage is then chosen such that it corresponds to a maximum width of an animal.

In an embodiment the closure comprises a bracket which is mounted transversely of the separating fences for pivoting relative to the separating fences. Pivoting the bracket can move it to the open position or to the first or second closed position.

In an embodiment the closure further comprises a fence which is mounted pivotally on the bracket and extends between the separating fences over substantially the width of the passage when in the first or second closed position. The fence provides a greater closing area so that the closure can close the passage substantially wholly to an animal so that animals cannot get at an animal present in the feeding stall, even partially for instance with their heads.

In a preferred embodiment, the fence is provided with one or more support parts which are adapted to support on one or both of the separating fences when the closure is in the first or second closed position. In the first and second closed position, the weight of the bracket and the fence is thus supported by the separating fences.

In an embodiment the support parts, at least when the closure is in the first or second closed position, are arranged on an upper side of the fence and lie against an upper side of the first and/or the second separating fence. When the fence is wider on its upper side than the passage, at least when the closure is in the first or second closed position, this wider part then forms a support part which lies against the upper side of the first and/or second separating fence.

In an embodiment the pivot point of the bracket and the separating fences is arranged on an upper side of the separating fences, preferably at a position halfway along the length of the separating fences. When the bracket is in the opened position, animals can walk through the passage under the bracket and/or the fence, while the bracket does not limit the width of the passage for the animals, or hardly so.

In an embodiment the separating fences are provided on their upper side with recesses for receiving the support part of the fence when the closure is in the first or second position. When the support part is received in the recess, the port is supported in at least two positions, i.e. at the recess and at the pivot point between the bracket and the fence. The recess is preferably formed such that, when the support part is received in the recess, a substantially horizontal movement of the support part is prevented by the recess; a force exerted substantially horizontally on the fence then no longer results in pivoting of the fence about its pivot point with the bracket.

In an embodiment the feeding stall is further provided with an arm which is pivotally connected to a separating fence and to the fence so that a four-bar mechanism is formed by the fence, the bracket, the separating fence and the arm, which mechanism is adapted to keep an orientation of the fence substantially vertical relative to the floor in the first and second closed position.

In an embodiment the feeding stall further comprises an actuator for driving movement of the closure to the closed position and to the first and/or second open position. In an embodiment the actuator is connected to the bracket in order to bring about rotation of the bracket around a shaft transversely of the separating fences. Suitable actuators comprise, among others, linear cylinders such as air cylinders, electrically driven cylinders and hydraulic cylinders, and rotary motors. The actuator is preferably controlled by a control device. This control device is preferably adapted to displace the closure to the second closed position after a predetermined period of time when an animal is present in the feeding stall. The time for which an animal present in the feeding stall can eat is thus limited so that different animals are given the chance to use the feeding stall.

In an embodiment the control device is connected to animal recognition means which are adapted to recognize an animal when the animal is present at or close to the first distance from the feed trough, wherein the control device is adapted to control the actuator in order to move the closing means to the first, second and/or third position on the basis of the recognized animal.

In an embodiment the feeding stall comprises a first receiver and a second receiver for receiving an animal identification signal from a transmitter attached to an animal, wherein the first receiver and the second receiver form the animal recognition means and are placed on or at an entry side of the passage of respectively the first separating fence and the second separating fence, wherein the control device is adapted to control the actuator to move to the first, second and/or third position on the basis of the recognized animal when an animal is recognized between the two receivers.

In an embodiment the feed trough further comprises a weighing device for measuring the weight of feed present in the feed trough, wherein the weighing device is connected to the control device and the control device is further adapted to move the closure to the second position when the weight of feed weighed in the feed trough is less than a predetermined weight.

In an embodiment the feeding stall further comprises a compressed air line which is placed at the feed trough and is connected to a compressed air device, wherein the compressed air device is adapted to carry a blast of compressed air through the compressed air line after a predetermined feeding time and/or when feed is no longer present in the feed trough. An animal struck by the blast of compressed air will want to leave the feeding stall, so leaving the feeding stall free for other animals.

According to a fourth aspect, the invention comprises a method for mapping positions of animals in an animal accommodation, comprising the steps of: i) equipping animals with a transmitter, wherein the transmitter is adapted to transmit a signal comprising an identifier and a position indication of the animal, ii) receiving the transmitted signals from the animals with a receiver, iii) determining the identifier and a position of an animal from the received signal, and iv) storing in a database the identifier, the position associated therewith and an indication of the time at which they were determined. With this method it is possible to determine at any desired moment where a determined animal is located, and the movements of an animal or animals can also be monitored over a longer period of time. Steps ii)-iv) are performed repeatedly here. An indication of the time at which the position and identifier were determined can comprise, among others, the time at that moment and/or a serial number of the received signal.

In an embodiment the transmitter comprises a position-determining system and the position indication comprises a position of the animal determined by the position-determining system. The position of an animal can thus be determined directly from the signal, irrespective of a position of the receiver. An example of a suitable position-determining system is GPS.

In an embodiment the animal accommodation comprises three or more receivers whose positions are known, and the position of an animal is determined by comparing to each other a strength and/or delay of the transmitted signal at the three or more receivers, for instance by means of triangulation.

In an embodiment the method further comprises of showing stored position and identifier data on a floor plan of the area. The movement of the animals in the area, for instance an animal accommodation, can thus be viewed in time so that possible aberrant behaviour can easily be noticed.

In an embodiment the transmitter comprises a battery, and the method further comprises a step of charging the battery via induction and/or slide contacts when the animal is standing at a feeding stall, preferably when the animal is standing at a feeding stall as described above. Charging of the battery can thus be performed without further human intervention.

In an embodiment the method comprises of using the determined positions of animals to determine a route for a mobile machine, such as a mobile feeding fence, a manure scraping robot, a spreader robot and/or a mobile feeding robot. These mobile machines can thus be steered around the animals in the accommodation.

In an embodiment the determined position of an identified animal is used as animal recognition for the above described feeding stall and/or the above described mixing and dosing device and/or the above described animal tracking system.

The aspects and measures described in this description and claims of the application and/or shown in the drawings of this application can, where possible, also be applied separately of each other. These separate aspects, and other aspects, can be the subject of divisional patent applications relating thereto. This is particularly the case for the measures and aspects described per se in the dependent claims.

BRIEF DESCRIPTION OF THE DRAWINGS

FIG. 5a is a perspective view of feeding stall according to the invention.

BEST MODE FOR CARRYING OUT THE INVENTION

Figure 1A:
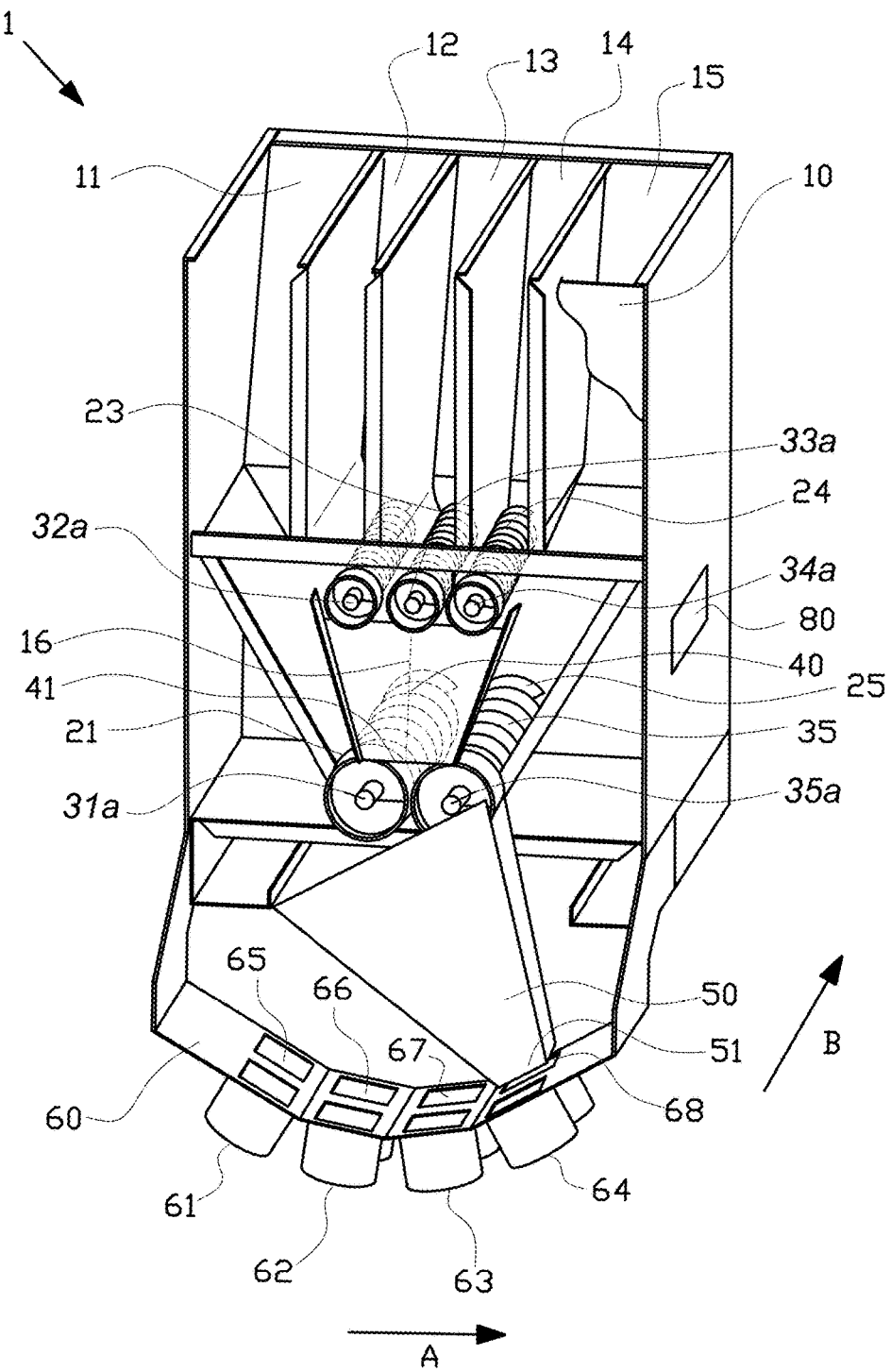
FIGS. 1A and 1B show an isometric view of a mixing and dosing device according to the invention and a detail of the driving thereof.
Figure 1B:
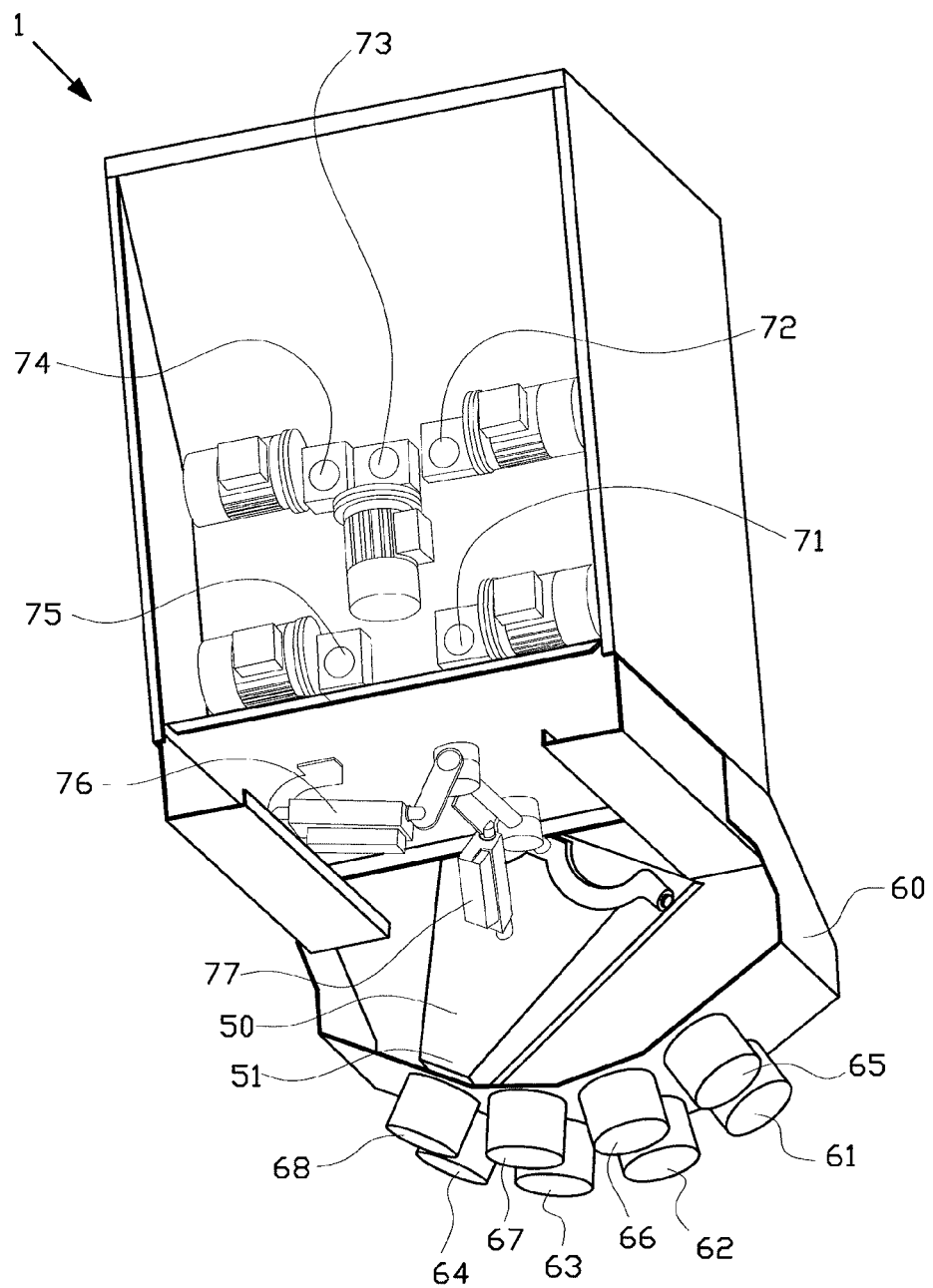

FIGS. 1A and 1B show a mixing and dosing device 1 according to the invention as seen from respectively a front side and a rear side. On an upper side the mixing and dosing device comprises five feed hoppers 11, 12, 13, 14, 15 for different types of feed, such as for instance concentrated feed, ground and/or crushed grain, different mixtures of tubers and optionally wet by-products. The hoppers are shown cut-away here but are covered by cover plate 10 during normal use.

Hoppers 11, 12, 13, 14, 15 are provided on an underside with respective openings 21, 22, 23, 24, 25 in which associated augers 31, 32, 33, 34, 35 are placed. Each auger is adapted to transport feed from the associated feed hopper to an outer end 31a, 32a, 33a, 34a, 35a of the auger. The augers act here as dosing device; when an auger does not turn, no feed is transported out of the associated hopper.

Hoppers 11 and 15 extend partially under hoppers 12, 13, 14 and have a larger volume than feed hoppers 12, 13, 14. The augers 31,35 placed in the openings on the underside of hoppers 11 and 15 are connected to electric motors 71,75 which are adapted to drive augers 31,35 such that feed from hoppers 11,15 is transported to auger outer ends 31a,35a on the front side of mixing and dosing device 1. Motors 71,75 are placed on a rear side of the mixing and dosing device, as shown in FIG. 1B.

The hoppers 12,13 and 14 placed in the centre debouch on the underside of the hoppers via openings 22, 23, 24 and augers 32, 33, 34 into auger outer ends 32a,33a and 34a. These auger outer ends are placed above a slide plate 40, the downstream edge 41 of which protrudes beyond auger outer ends 31a,35a, so preventing feed from hoppers 12, 13, 14 being able to enter augers 31,35. The feed from augers 31-35 then falls into a pivoting distributing hopper 50 which can pivot so that the downstream outer end 51 of distributing hopper 50 is located above one of the outfeed ports 61-68.

FIG. 1B shows in more detail the driving of augers 31-35 and of the pivoting distributing hopper 50. Linear actuators 76,77, formed here by air cylinders, are adapted to position the pivoting distributing hopper above one of the outfeed ports 61-68. Linear actuator 76 is adapted to drive a pivoting movement of distributing hopper 50 substantially along a first pivoting direction A of the distributing hopper, while linear actuator 77 is adapted to drive pivoting in a pivoting direction B substantially transversely thereof. Linear actuators 76,77 are connected to a control device 80 which is adapted to control the actuators for the purpose of positioning the distributing hopper 50 with its downstream end 51 above a selected outfeed port of outfeed ports 61-68.

Motors 71-75 are adapted to drive augers 31-35 in order to transport feed out of hoppers 11-15 to and beyond the auger outer ends 31a, 32a, 33a, 34a, 35a and thus form, together with the augers, a motorized transport device. Control device 80 is adapted to individually control the transport speed of each of the transport devices so that a desired mixing ratio of feed can be obtained from the multiple hoppers. This can for instance take place by causing motors 71-75 to rotate the associated augers 31-35 for the same time duration but at different rotation speeds. Alternatively, mixing takes place by having each of the motors 71-75 rotate at the same speed but for different lengths of time. Motors 71-75 are preferably activated and deactivated for the same length of time at frequencies individually determined for these transport devices so that a mixing effect is already achieved during the transport of feed from the different hoppers, while simple motors having only one rotation speed can be used.

Figure 2:
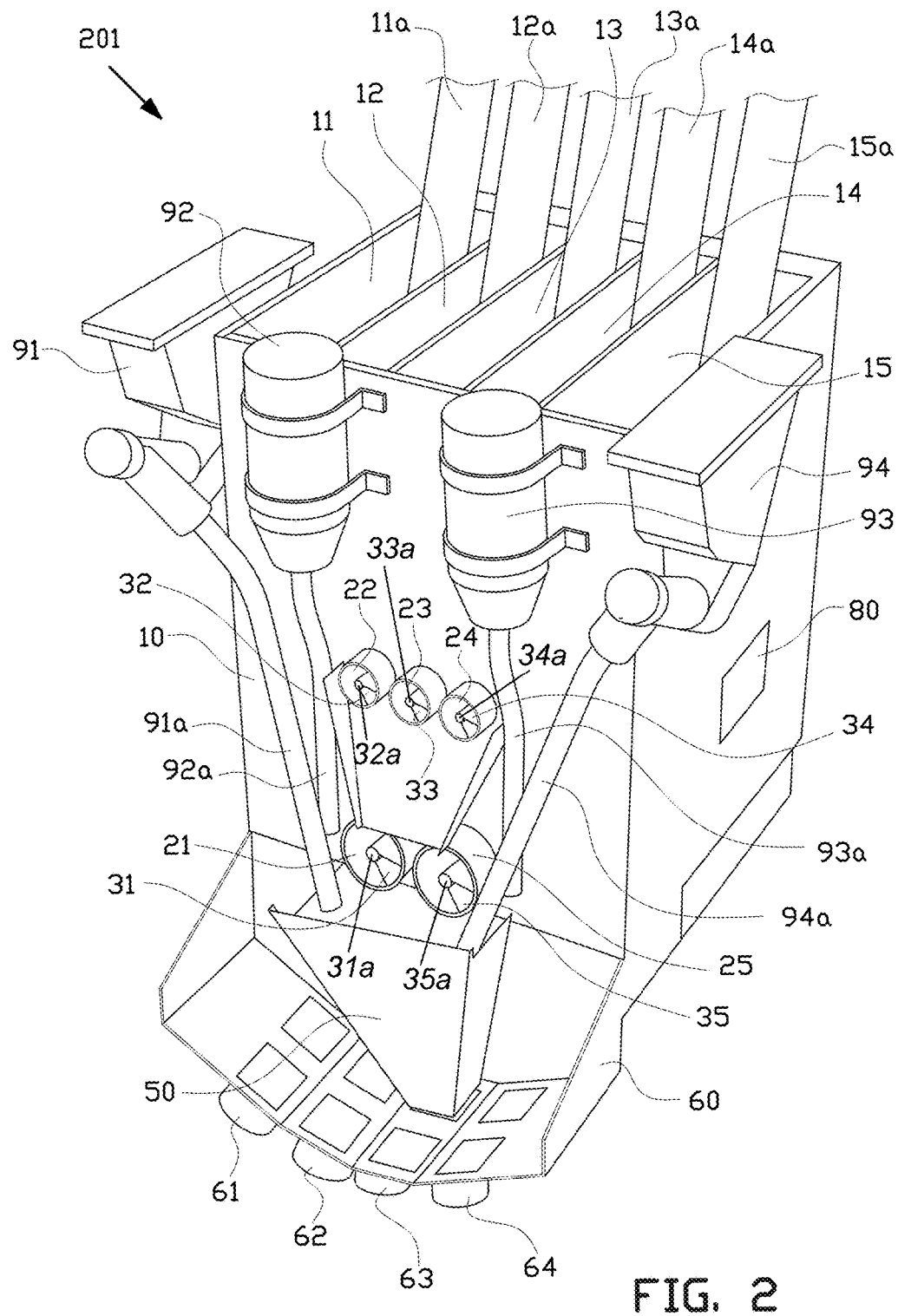
FIG. 2 is a perspective view of a second embodiment of mixing and dosing device according to the invention.

FIG. 2 shows a schematic perspective view of a mixing and dosing device 1 according to the invention, further provided with additive dosing devices 91, 92, 93, 94 which each have an outlet 91a, 92a, 93a, 94a positioned above distributing hopper 50. The additive dosing devices 91, 92, 93, 94 are connected to control device 80 which is further adapted to control the additive dosing devices in order to add doses of additives to a mixture in distributing hopper 50. Additive dosing devices 92 and 93 are adapted here to add one or more predetermined doses of medicine to the mixture and dosing devices 91 and 94 are adapted to add one or more predetermined doses of minerals to the mixture.

Shown on the upper side of hoppers 11-15 are supply conduits 11a, 12a, 13a, 14a, 15a which are connected to silos with different types of feed and from which hoppers 11-15 are replenished when they are on the point of being emptied. The different types of feed, which for instance comprise differing percentages of moisture, thus remain separated from each other until immediately before the mixing, whereby the feeds have a longer storage life.

Figure 3:
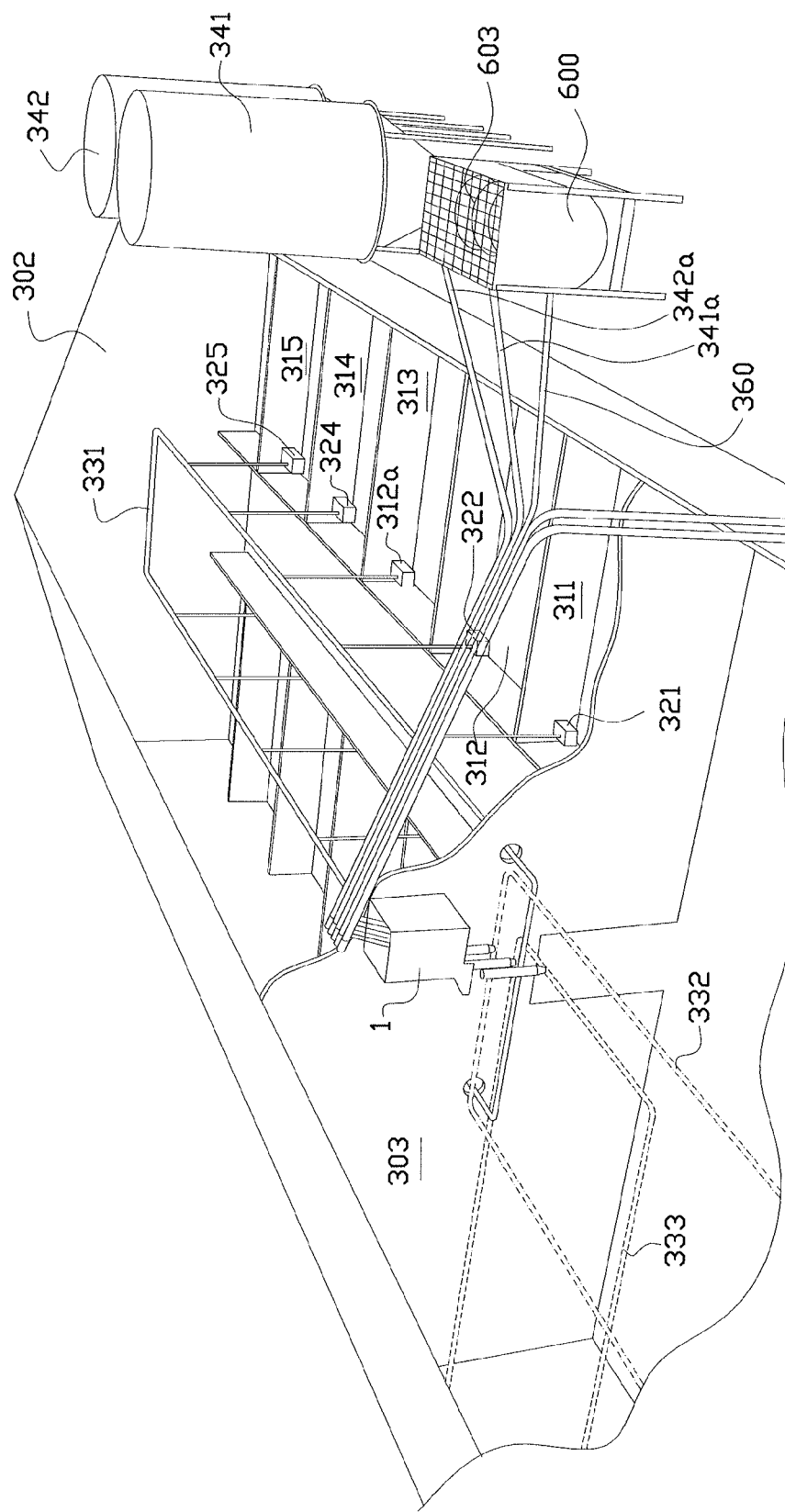
FIG. 3 is a perspective view of a mixing and dosing device according to the invention, placed in an animal accommodation and connected to a ring conduit.

FIG. 3 shows a mixing and dosing device 1 according to the invention mounted on a wall 303 of an animal accommodation 302. The accommodation 302 is divided into a number of feeding stalls 311, 312, 313, 314, 315. After leaving the distributing hopper of mixing and dosing device 1, doses of mixed fodder enter one of the ring conduits 331, 332, 333 which each follow a route along different feeding stalls. FIG. 3 shows only the route followed by ring conduit 331 in its entirety. Animals with different feeding requirements can be accommodated in each stall 311, 312, 313, 314, 315 along the ring conduit 331. 3 to 5 week-old piglets can for instance be accommodated in feeding stall 311, 5 to 6 week-old piglets in feeding stall 312, and so on. All animals in a stall receive feed in the same mixing ratio, while the mixing ratio of feed being supplied to the stalls differs between the stalls. Ring conduit 331 transports a dose of mixed fodder to the correct stall, where it is released from ring conduit 331 via a per se known valve system and enters one of the feed troughs 321, 322, 323, 324, 325. Because the mixing and dosing device 1 is placed at a high position relative to feed troughs 321-325, the mixing and dosing device and the supply conduits 341a, 342a, 360 thereto from respective silos 341, 342 and cutting device 600 do not take up any floor space. Cutting device 600 is placed for the purpose of cutting fodder, such as tubers, fed into the cutting device on an upper side of the cutting device through grating 603 before it is carried via supply conduit 360a to a hopper of mixing and dosing device 1.

Figure 4:
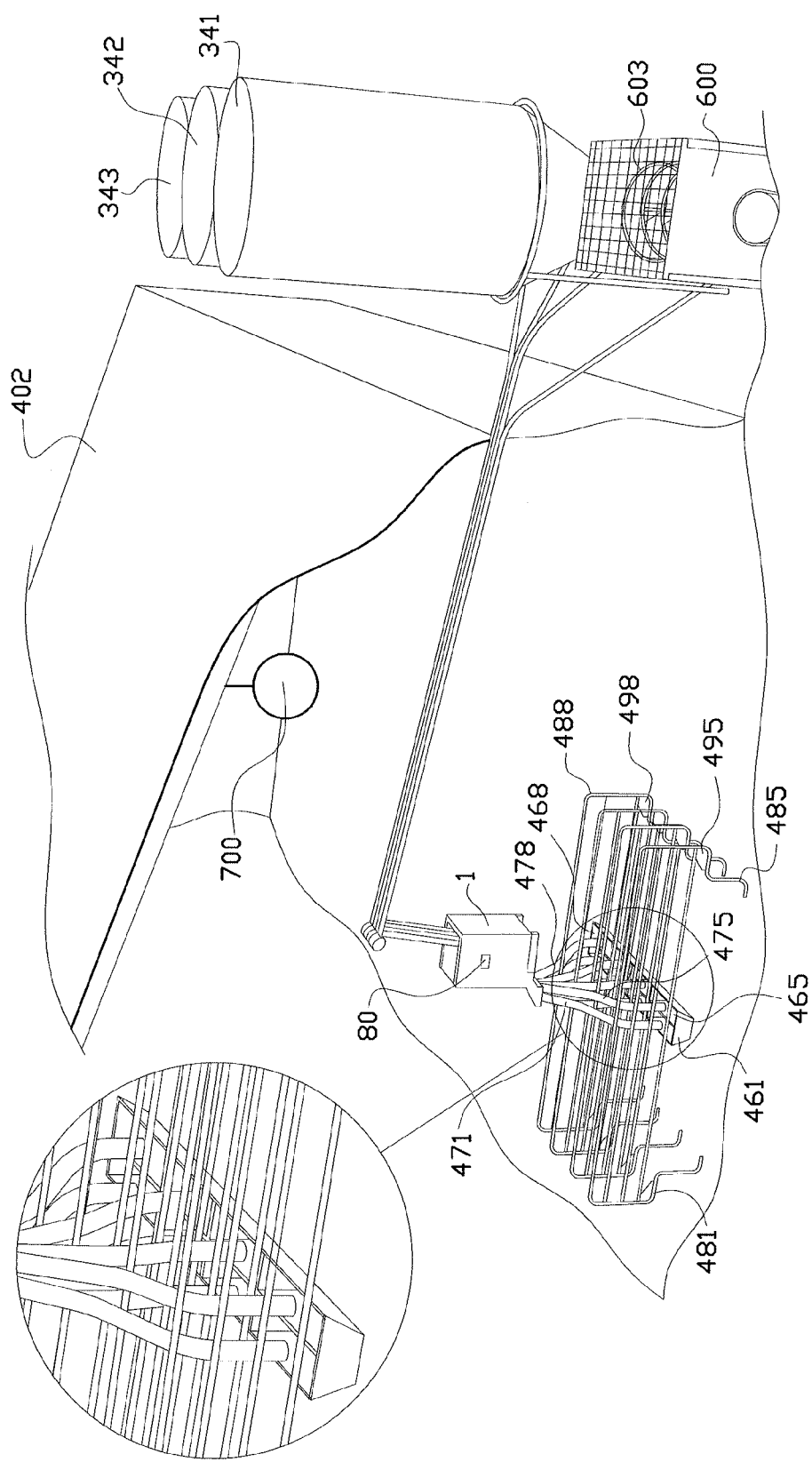
FIG. 4 is a perspective view of a mixing and dosing device according to the invention connected to feeding stalls in an animal accommodation.

FIG. 4 shows mixing and dosing device 1 in an animal accommodation 402, wherein the mixing and dosing device comprises feed troughs 461-468, wherein each of the feed troughs is connected via a drop channel 471-478 to an outfeed port of mixing and dosing device 1. The feed troughs are mutually separated by separating fences 481-488 so that only one animal at a time, such as a cow, can reach a feed trough. Animal recognition means 491-498 are placed on each separating fence at a distance from the associated feed trough 461-468. These animal recognition means are connected to the control means 80 of mixing and dosing device 1, wherein control means 80 are adapted to mix and/or dose feed from the different hoppers on the basis of an animal recognized with the animal recognition means. Control device 80 is adapted here to take into account previous eating behaviour of an animal and/or to store eating data of a recognized animal in a database connected to control device 80.

The animal recognition means are used to recognize an animal at a predetermined position, i.e. at the entrance of one of the feeding stalls. In order to determine the position of an animal at a random location inside accommodation 402 signal receiving means are arranged on the roof of the accommodation in the form of a sphere 700 which is adapted to receive a signal comprising position and identification data of an animal. The animals are provided here with a transmitter adapted to transmit such a signal. The signal receiving means are connected to the control device, which is further adapted to store in a database the position and identification data determined from the signal. The shown signal receiving means comprise only one receiver for receiving one or more signals comprising identification data and positional information from a transmitter, wherein each transmitter attached to an animal is provided with a GPS receiver and the transmitter is adapted to transmit a signal comprising animal identification data and the position data from the associated GPS receiver. Alternatively, the signal receiving means can comprise a plurality of receivers placed at different known positions inside the accommodation, for instance at three different locations in the accommodation, wherein the signal receiving means are adapted to determine a position of a transmitter on the basis of the different signal strengths of the signal transmitted by the transmitter and received at the different receivers.

The position data of identified animals are used to control routes for mobile machines, such as a manure robot, a spreader robot for spreading sawdust and/or straw, and/or a mobile feeding robot. These mobile machines preferably receive their control data wirelessly from control device 80.

FIG. 5A shows a number of feeding stalls 501, 502, 503, 504 according to a second aspect of the invention, suitable for use with a mixing and dosing device as described above. Although only feeding stall 501 is discussed here in more detail, it will be apparent that the other feeding stalls are constructed in the same way. Feeding stall 501 comprises a first separating fence 511 and a second separating fence 512 disposed parallel thereto. Together the separating fences 511,512 define a passage for an animal, such as a cow, to reach a feed trough 561. Feeding stall 501 is shown in a position in which a closure 520,530 closes access of an animal to feed trough 513. The closure comprises a bracket 520 pivotable about rotation point 532 relative to the separating fences and a fence 530 which is rotatable relative to bracket 520 and extends substantially over the width of the passage. In the shown second position, closure 520,530 closes the access for an animal to feed trough 561 at a second distance d2 from the feeding fence. Bracket 520 is connected to a fence 530 for pivoting around shaft 531 formed by bracket 520. Fence 530 comprises two support parts 535,536 which form a part of fence 530 which is wider than the width B of the passage. When fence 530 is placed in the second position as shown, support parts 535,536 of the fence support on separating fences 511,512. The support parts are received here in recesses 515a, 516a on upper sides 511a, 512a of the separating fences. Recesses 515a, 516a prevent movement of fence 530 when movement of bracket 520 from the second position is blocked. An arm 540 is pivotally connected at rotation point 541 to fence 530, in particular to a transverse plate 533 of fence 530 comprising rotation points for both arm 540 and bracket 520 relative to the fence. Arm 540 is pivotally connected to separating fence 511 on another side at rotation point 542 so that fence 530 remains oriented substantially vertically relative to the floor surface when bracket 520 is moved.

Figure 5B:
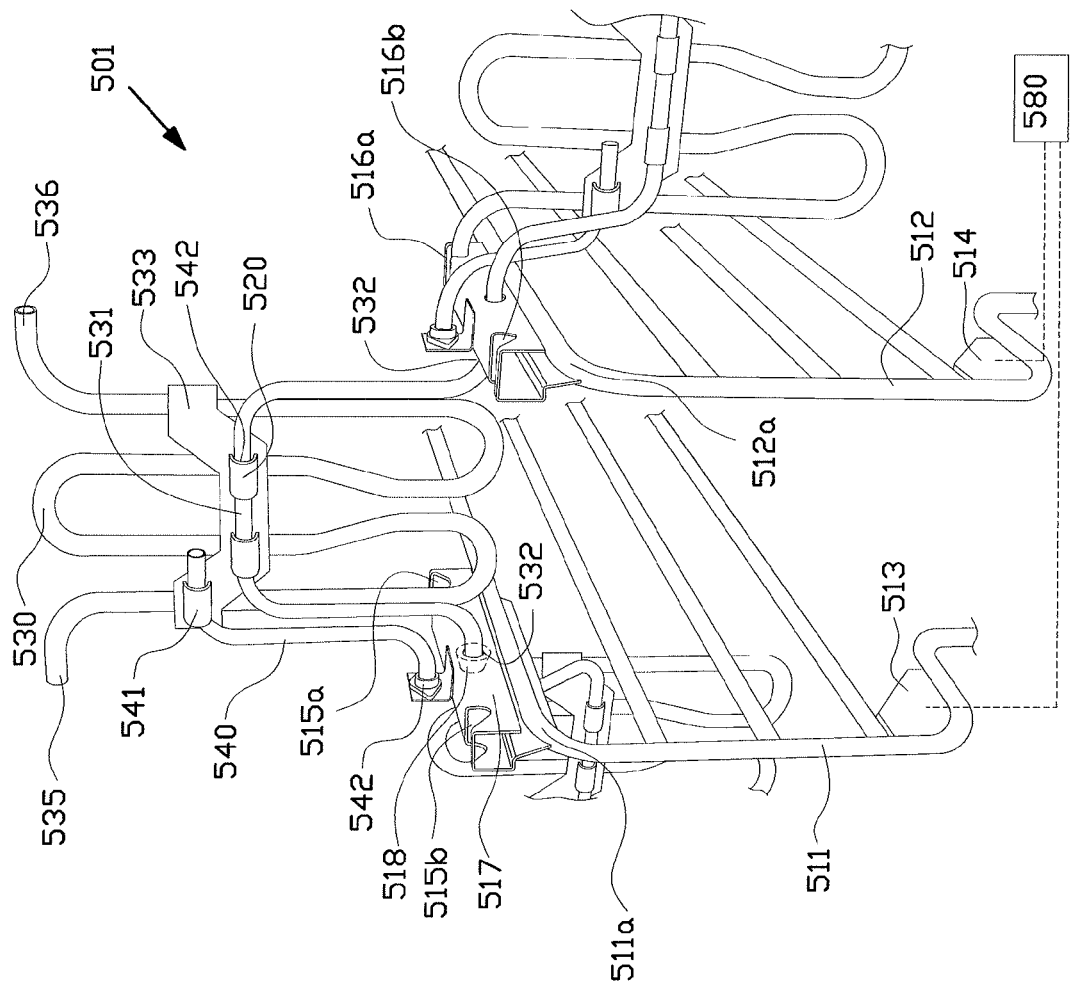
FIG. 5b is a perspective view of the feeding stall of FIG. 5a with closures in different positions.

FIG. 5b shows feeding stall 501 in more detail, wherein closure 520,530 is moved to an opened position so that an animal can move under closure 520,530 through the passage defined by separating fences 511,512. An actuator 518 shown with broken lines is received inside a housing 517 mounted on separating fence 511 and is adapted to drive movement of bracket 520 around pivot points 532.

Although not shown in FIG. 5B, bracket 520 is movable further to a first position in which it closes the passage on a side remote from the feed trough. When closure 520,530 is in the first closed position, fence 530 is situated at a first distance from the feed trough, this distance being greater than the length of an animal so that an animal can stand in feeding stall 501. An animal standing in the feeding stall while closure 520,530 is in the first position can thus eat undisturbed without the animal being jostled or bothered by other animals outside the feeding stall. This reduces stress in the eating animal and enhances feed take-up.

A first receiver 513 and a second receiver 514 forming part of animal recognition means for recognizing an animal are placed on the side of separating fences 511,512 remote from feed trough 513, at an entrance to the passage. The animal recognition means are adapted to recognize an animal standing at the entrance to feeding stall 501 on the basis of an identification signal transmitted by a transmitter arranged on an animal. This preferably proceeds as follows. Closure 520,530 of the feeding fence is first in the second closed position so that an animal can move at least partially into feeding stall 501 but is held at a first distance from the feed trough by closure 520,530. When walking into the passage the animal moves its head, on which a transmitter is arranged, between receivers 513 and 514. When an animal walks in or out of the feeding stall the strength of the signal received at receivers 513,514 will usually vary from weak to strong to weak when the animal and the respective transmitter move toward the rear side of separating fences 511, 512, the transmitter then moves between receivers 513,514 and the transmitter then once again moves further away from the receivers. When both receivers 513,514 receive the signal transmitted by the transmitter substantially equally strongly during such a signal variation, it is possible to determine that the animal identified by means of the received identification signal has walked between receivers 513,514. The animal recognition means are connected to a control device 580 which is adapted to control the actuator to move bracket 520 from the second closed position to the first closed position when it is determined that the identified animal must obtain access to the feed trough. When the bracket is in the first closed position, it closes the passage on a rear side.

The control device is further connected to a mixing and dosing device as described above and subsequently controls it in order to provide a dose of mixed fodder adapted to the identified animal, wherein the mixing ratio of the fodder mixture is also set on the basis of the recognized animal.

Figure 5C:
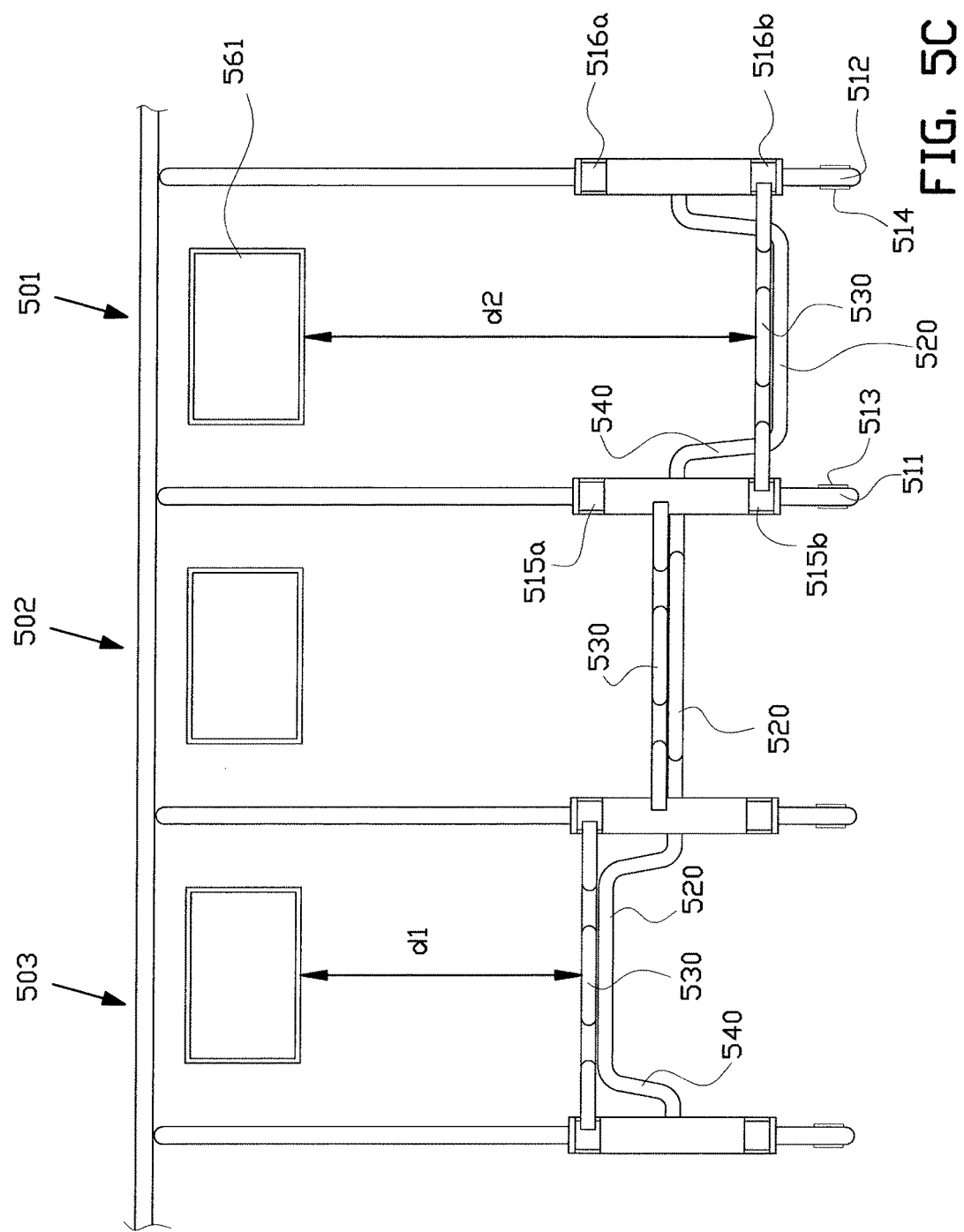
FIG. 5c shows a schematic top view of three feeding stalls according to the invention.

FIG. 5C shows a schematic top view of three feeding stalls 501, 502, 503 according to the invention, wherein the closures are in respectively the second closed position, the opened position and the first closed position. Feed troughs 561, 562, 562 are placed in the feeding stalls. The closure of feeding stall 501 is in the second closed position, in which the closure is at a second distance d2 from feed trough 561. Within this second distance d2 fits an animal which has access to feed trough 561 inside feeding stall 501. When the closure is in the shown second position an animal standing outside feeding stall 501 cannot get at feed trough 561 or the animal present in the feeding stall. The support parts of fence 530 are received in recesses 515*b* and 516*b* and support the weight of fence 530 and of bracket 520. The recesses are adapted here to support two support parts of mutually adjacent closures. When bracket 520 is moved out of the second position, fence 530 is held in substantially the same vertical orientation relative to the floor surface by arm 540 and bracket 520 pivoting parallel thereto.

The closure of feeding stall 502 is in the opened position, in which an animal can move in and out of the feeding stall under the closure.

The closure of feeding stall 503 is in the second closed position, in which an animal can partially enter the feeding stall but has no access to the feed trough. When entering the feeding stall an animal passes animal recognition means 513, 514 so that control device 580 can optionally bring about a movement of bracket 520 to another position on the basis of the recognized animal.

Figure 6:
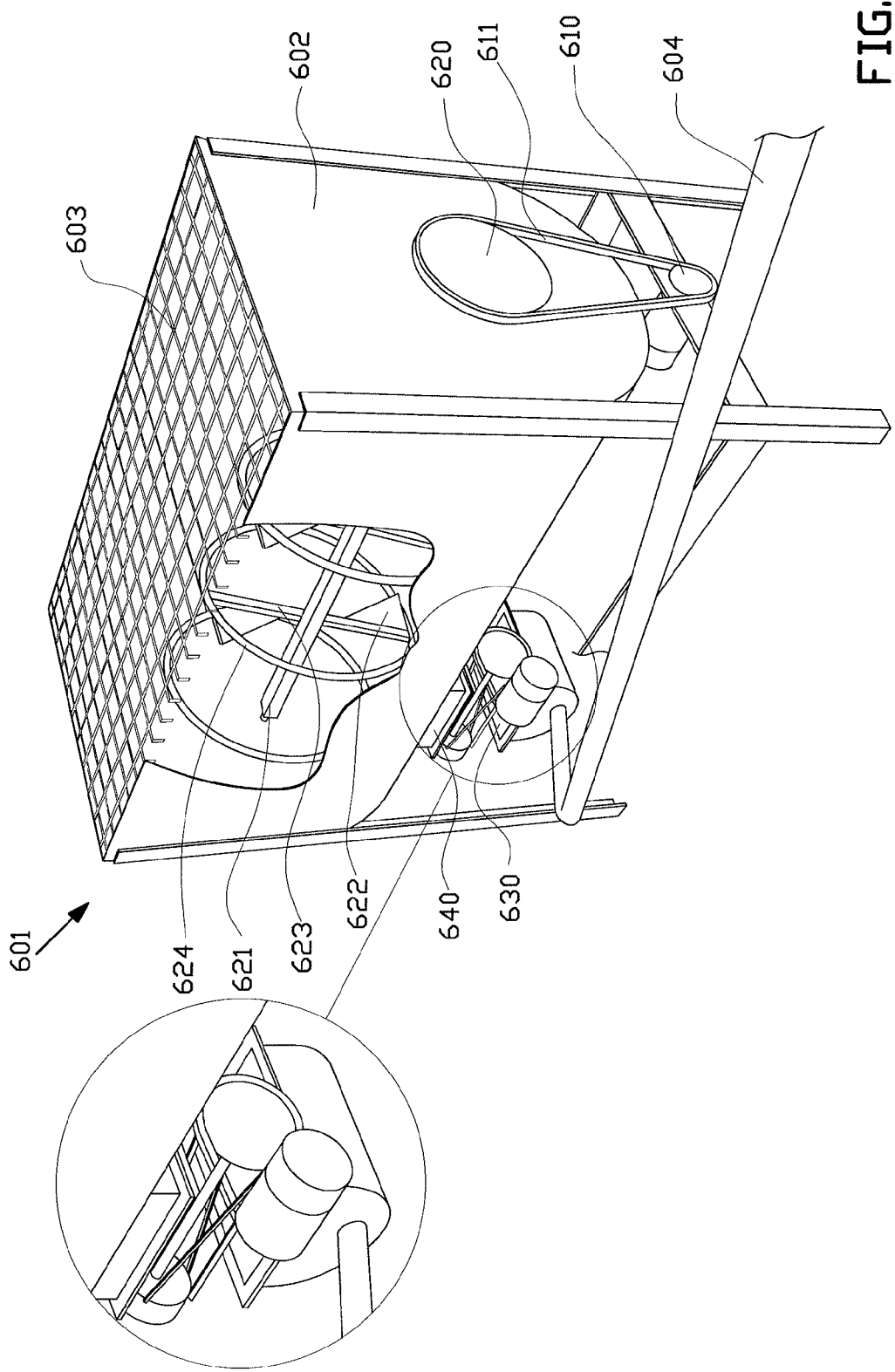
FIG. 6 is a perspective view of a cutting device for cutting types of feed supplied to a mixing and dosing device according to the invention.

FIG. 6 shows a cutting device 600 for feeding wet products such as tubers or other products which must be cut immediately before being supplied to animals. Cutting device 600 comprises a bin 602 which is covered on an upper side by a safety grating 603 through which uncut products can pass. The uncut products can be placed through grating 603 into the bin on the upper side of the cutting device, for instance using a feed loader. Inside the bin a rotation shaft 621 extends over the longitudinal direction of the bin, wherein the rotation shaft is connected via a disc 620 and belt transmission 611 to a drive motor 610. Inside the bin the rotation shaft is connected to blades 622 and spring 624 which, during rotation of the shaft, mix the feed present in bin 602 and transport it in the direction of outfeed 640. The cutting device comprises a cutting machine 630 placed between outfeed 640 of the bin and a transport conduit 604. The cutting machine comprises a motor 631 and blades 632 which are driven by motor 631 and which cut the product leaving outfeed 640 before it is transported further by transport conduit 604 which leads to one of the hoppers of a mixing and dosing device according to the invention.

Figure 7:
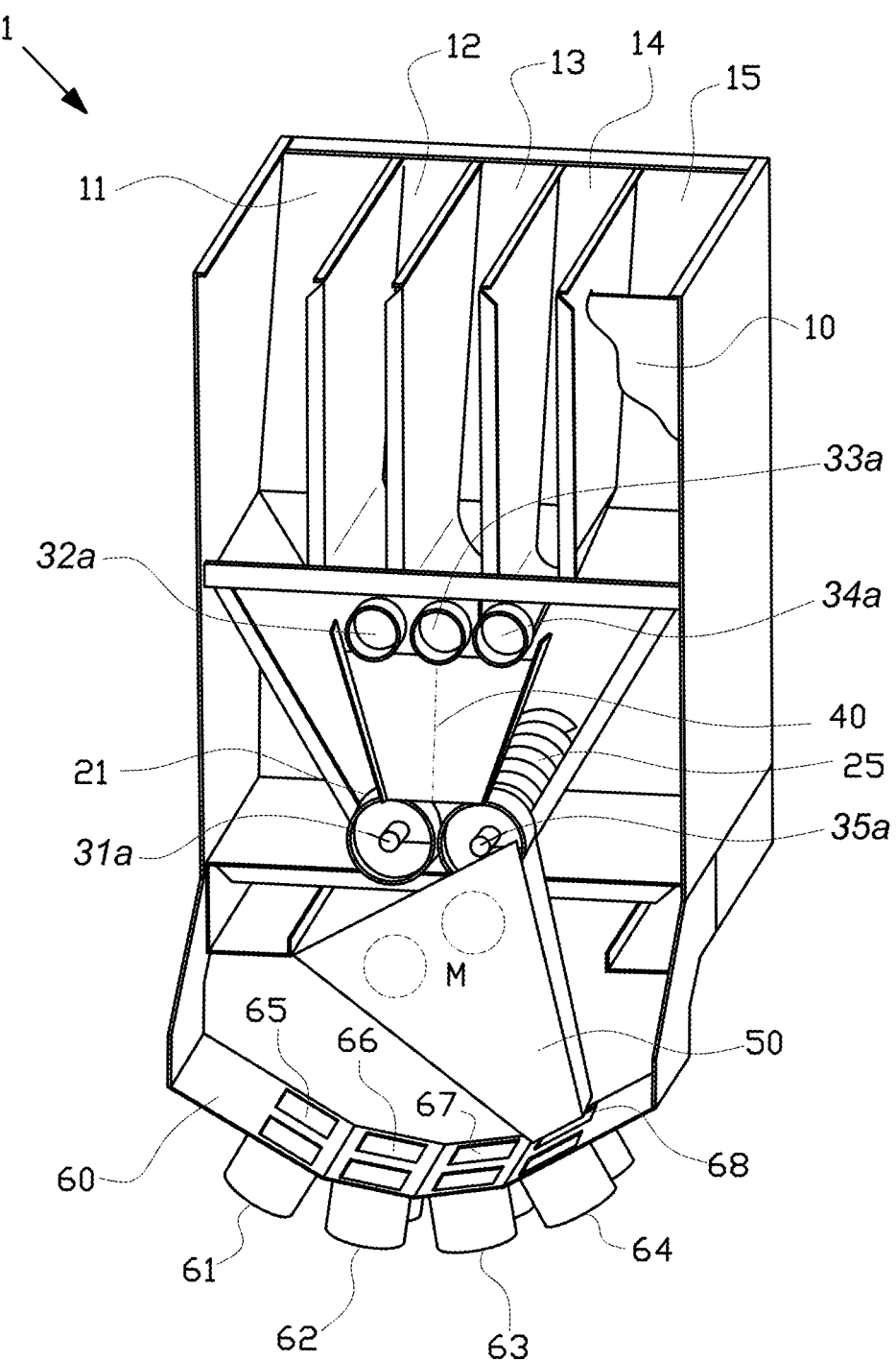
FIG. 7 is a perspective view of a third embodiment of a mixing and dosing device according to the invention.

FIG. 7 shows an embodiment of a mixing and dosing device 1 according to the invention, further provided with a schematically shown mixing mill M placed between the auger outer ends and the downstream outer end of distributing hopper 50. The mixing mill provides for additional mixing of the different types of feed coming out of the auger outer ends. Although the mixing mill shown here is mounted statically relative to the auger outer ends, it is also possible to envisage mounting the mixing mill in the distributing hopper.

The mixing and dosing device for cattle feed according to the invention realizes the dosing of the different feeds in inventive manner through variable speeds of the different feed augers, the volume displacements of which per rotation are pre-known. The dosage of each feed is hereby determined in inventive manner on the basis of the volume displaced by the relevant auger, and the use of further weighing equipment is avoided.

The above description is included for the purpose of illustrating the operation of preferred embodiments of the invention and not in order to limit the scope of the invention. On the basis of the above elucidation many variations which fall within the spirit and the scope of the present invention will be evident to the skilled person.

The invention claimed is:

1. An animal tracking system for animals in an animal accommodation, comprising a transmitter which is to be attached to an animal and which is adapted to transmit a signal comprising identification data and positional information of the transmitter, signal receiving means for receiving this signal and adapted to determine from the signal the identification data and a position of the transmitter, and a database for storing the determined position and the associated identification data and a mixing and dosing device (1), said mixing and dosing device (1) comprising a plurality of feed hoppers (11,12,13,14,15) for different types of feed, wherein each of the plurality of hoppers (11,12,13,14,15) has an infeed end and an outfeed end disposed thereunder, wherein a dosing device (91,92,93,94) is disposed in each hopper (11,12,13,14,15) at its outfeed end, further comprising a control device (80) adapted to control each of the dosing devices (91,92,93,94) in order to dose feed from the associated hopper (11,12,13,14,15), a pivotable distributing hopper (50) disposed under the plurality of outfeed ends, outfeed ports (61-68) placed under the distributing hopper (50) for connection to fodder conduits debouching in different feed troughs (321,322,323,324,325, 461-468, 561, 513, 561, 562), further comprising one or more actuators (76, 77) for pivoting the distributing hopper (50), wherein the control device (80) is further adapted to control the actuators (76, 77) so as to position the distributing hopper (50) with its downstream end substantially above a selected one of the outfeed ports (61-68), said mixing and dosing device (1) further comprising a plurality of feed troughs (321,322,323,324,325, 461-468, 561, 513, 561, 562), wherein each of the feed troughs (321,322,323,324,325, 461-468, 561, 513, 561, 562) is connected to an outfeed port, wherein the control device (80) is adapted to determine ratios in which the different types of feed are dosed from the different hoppers (11,12,13,14,15) on the basis of the animal or animal group associated with the feed trough (321,322, 323,324,325, 461-468, 561, 513, 561, 562), said mixing and dosing device (1) being further provided with animal identification means for identifying animals or animal groups at the feed trough (321,322,323,324,325, 461-468, 561, 513, 561, 562), wherein the control device (80) is adapted to determine ratios in which the different types of feed are dosed from the different hoppers (11,12,13,14,15) on the basis of the animal or animal group recognized at the feed trough (321,322,323,324,325, 461-468, 561, 513, 561, 562), said animal tracking system and said mixing and dosing device (1) being adapted for operable communication.

2. Animal tracking system according to claim 1, further comprising a feeding stall (501,502,503,504) for feeding cattle, comprising a first separating fence (511) and a second separating fence (512) which are disposed parallel to each other, wherein the two separating fences (511, 512) define a passage for an animal to reach a feed trough (561, 513, 561, 562), further comprising a closure (520, 530) which is movable to an opened position, in which it leaves the passage for an animal open, wherein the closure is movable further to a first closed position in which it closes the passage to an animal at a first distance from the feed trough (561, 513, 561, 562), wherein the first distance is greater than the length of an animal, said animal tracking system and said feeding stall (501,502,503,504) being adapted for cooperation.

3. Animal tracking system according to claim 2, wherein the closure (520, 530) is movable further to a second closed position, in which it closes the passage to an animal at a second distance from the feed trough (561, 513, 561, 562), wherein the second distance is smaller than the first distance.

4. Animal tracking system according to claim 2, wherein the closure (520, 530) comprises a bracket (520) which is mounted transversely of the separating fences (511, 512) for pivoting relative to the separating fences (511, 512).

5. Animal tracking system according to claim 4, wherein the closure (520, 530) further comprises a fence (530) which is mounted pivotally on the bracket (520) and extends between the separating fences (511, 512) over substantially the width of the passage when in the first or a second closed position.

6. Animal tracking system according to claim 5, wherein the fence (530) is provided with one or more support parts (535, 536) which are adapted to support on one or both of the separating fences (511, 512) when the closure (520, 530) is in the first or second closed position.

7. Animal tracking system according to claim 6, wherein the one or more support parts (535, 536), at least when the closure (520, 530) is in the first or second closed position, are arranged on the upper side of the fence (530) and lie against an upper side of the first and/or the second separating fence (512).

8. Animal tracking system according to claim 5, wherein the pivot point (532) of the bracket (520) and the separating fences (511, 512) is on an upper side of the separating fences (511, 512), preferably at a position halfway along the length of the separating fences (511, 512).

9. Animal tracking system according to claim 6, wherein the separating fences (511, 512) are provided on their upper side with recesses (515b, 516b) for receiving the one or more support parts of the fence (530) therein when the closure (520, 530) is in the first or second closed position.

10. Animal tracking system according to claim 4, further provided with an arm (540) which is pivotally connected to a separating fence (511) and to the fence (530) so that a four-bar mechanism is formed by the fence (530), the bracket (520), the separating fence and the arm (540), which mechanism is adapted to keep an orientation of the fence (530) substantially vertical relative to the floor in the first and a second closed position.

11. Animal tracking system according to claim 2, further comprising a first receiver (513) and a second receiver (514) for receiving an animal identification signal from a transmitter attached to an animal, wherein the first receiver (513) and the second receiver (514) form the animal recognition means (513, 514) and are placed on or at an entry side of the passage of respectively the first separating fence (511) and the second separating fence (512), wherein a control device (80) is adapted to control an actuator (518) to move the closure to different positions on the basis of the recognized animal when an animal is recognized between the two receivers (513, 514).

12. Animal tracking system according to claim 2, further comprising a weighing device for measuring the weight of feed present in the feed trough (561, 513, 561, 562), wherein the weighing device is connected to the control device (80) and the control device (80) is further adapted to move the closure (520, 530) to a second position when the weight of feed weighed in the feed trough (513) is less than a predetermined weight.

13. Animal tracking system according to claim 2, further comprising a compressed air line which is placed at the feed trough (561, 513, 561, 562) and is connected to a compressed air device, wherein the compressed air device is adapted to carry a blast of compressed air through the compressed air line after a predetermined feeding time and/or when feed is no longer present in the feed trough (561, 513, 561, 562).

14. A method for mapping positions of animals in an animal accommodation, comprising the steps of:
 i) equipping animals with a transmitter, wherein the transmitter is adapted to transmit a signal comprising an identifier and a position indication of the animal,
 ii) receiving the transmitted signals from the animals with a receiver,
 iii) determining the identifier and a position of an animal from the received signal, and
 iv) storing in a database the identifier, the position associated therewith and an indication of the time at which they were determined,
 v) using the determined position of an identified animal in a mixing and dosing device (1) for cattle feed, comprising a plurality of feed hoppers (11,12,13,14,15) (11,12,13,14,15) for different types of feed, wherein each of the plurality of hoppers (11,12,13,14,15) has an infeed end and an outfeed end disposed thereunder, wherein a dosing device (91,92,93,94) is disposed in each hopper (11,12,13,14,15) at its outfeed end, further comprising a control device (80) adapted to control each of the dosing devices (91,92,93,94) in order to dose feed from the associated hopper (11,12,13,14,15), a pivotable distributing hopper (50) disposed under the plurality of outfeed ends, outfeed ports (61-68) placed under the distributing hopper (50) for connection to fodder conduits debouching in different feed troughs (321,322,323,324,325, 461-468, 561, 513, 561, 562), further comprising one or more actuators (76, 77) for pivoting the distributing hopper (50), wherein the control device (80) is further adapted to control the actuators (76, 77) so as to position the distributing hopper (50) with its downstream end substantially above a selected one of the outfeed ports (61-68).

15. A method as claimed in claim 14, wherein the determined position of an identified animal is used as animal recognition in a feeding stall (501,502,503,504) for feeding cattle, comprising a first separating fence (511) and a second separating fence (512) which are disposed parallel to each other, wherein the two separating fences (511, 512) define a passage for an animal to reach a feed trough (561, 513, 561, 562), further comprising a closure (520, 530) which is movable to a first opened position, in which it leaves the passage for an animal open, wherein the closure is movable further to a first closed position in which it closes the passage to an animal at a first distance from the feed trough (561, 513, 561, 562), wherein the first distance is greater than the length of an animal; said feeding stall (501,502, 503,504) further comprising an actuator (518) for driving movement of the closure (520, 530) to the first closed position and to the first and/or a second open position, said feeding stall (501,502,503,504) further comprising a control device (80) adapted to control the actuator (518) to move the closure (520, 530) to the first and/or second closed position and/or to the first opened position, wherein the control device (80) is connected to animal recognition means (513, 514) which are adapted to recognize an animal when the animal is present at or close to the first distance from the feed trough (561, 513, 561, 562), wherein the control device (80) is adapted to control the actuator (518) in order to move the closure to a different position on the basis of the recognized animal.

\* \* \* \* \*